(No Model.) 2 Sheets—Sheet 1.

J. MACKINNON.
SELF ACTING DOUGH BREAKER.

No. 273,114. Patented Feb. 27, 1883.

Witnesses:
Robert D. Thompson
D. Horton Thomas

Inventor:
John Mackinnon

N. PETERS. Photo-Lithographer, Washington, D. C.

(No Model.) 2 Sheets—Sheet 2.

J. MACKINNON.
SELF ACTING DOUGH BREAKER.

No. 273,114. Patented Feb. 27, 1883.

Witnesses:
Robert D. Thompson
L. Gorton Thomas

Inventor:
John Mackinnon

UNITED STATES PATENT OFFICE.

JOHN MACKINNON, OF DENVER, COLORADO.

SELF-ACTING DOUGH-BREAKER.

SPECIFICATION forming part of Letters Patent No. 273,114, dated February 27, 1883.

Application filed June 5, 1882. (No model.)

*To all whom it may concern:*

Be it known that I, JOHN MACKINNON, a citizen of the United States, residing in the city of Denver, in the county of Arapahoe and State of Colorado, have invented a new and useful Self-Acting Dough-Breaker, of which the following is a specification.

My invention relates to certain improvements in dough-breaking machines.

The construction and operation of my machine will first be described, and the invention will then be designated in the claims.

Figure 1:
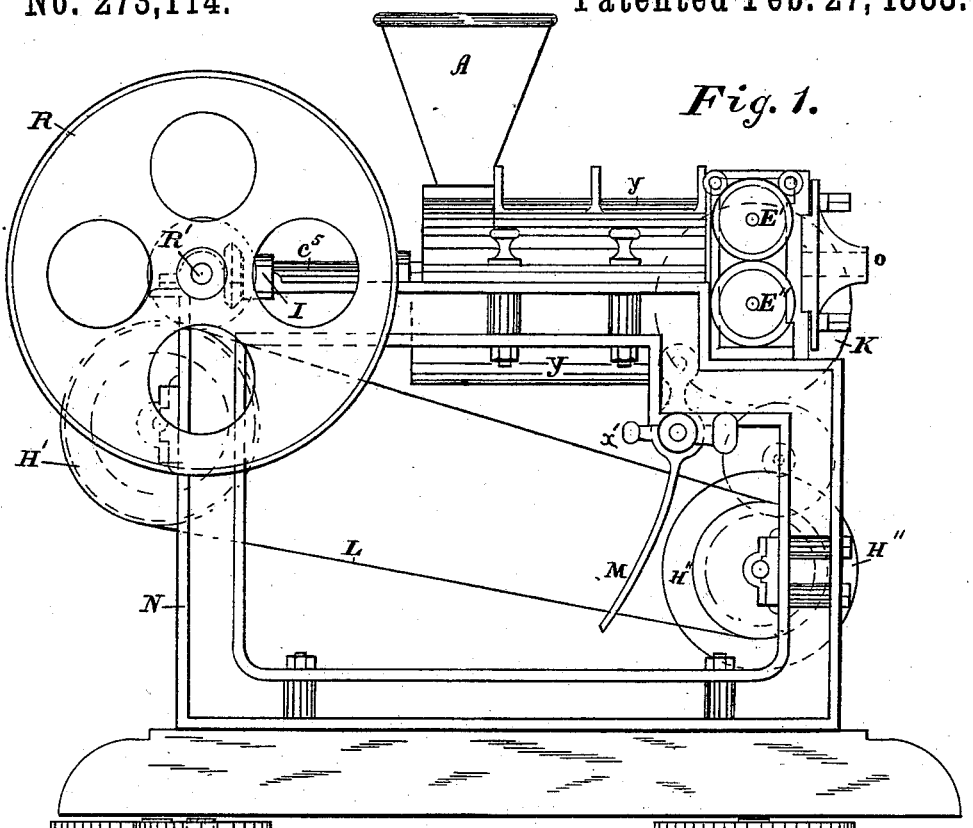
Figure 2:
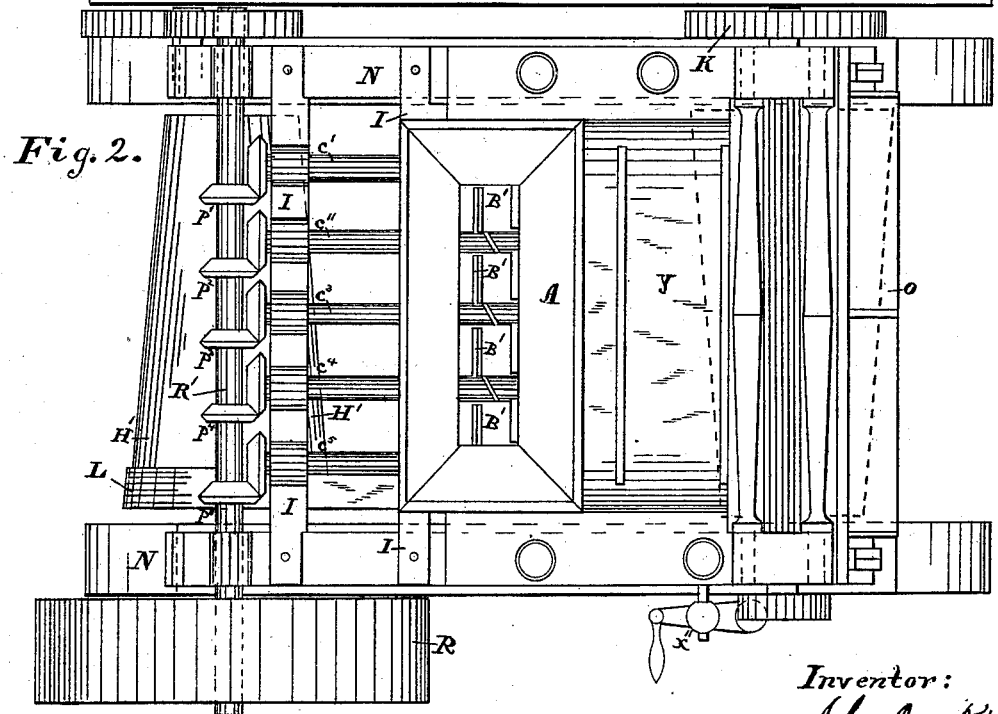
Figure 3:
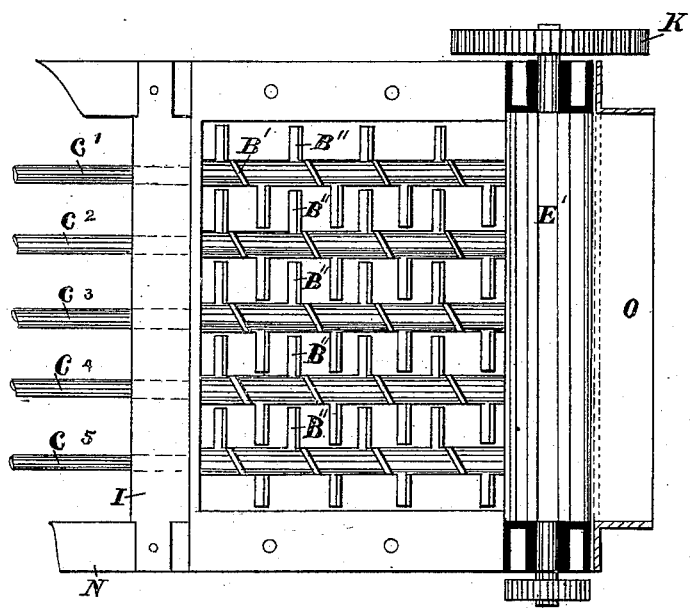
Figure 4:
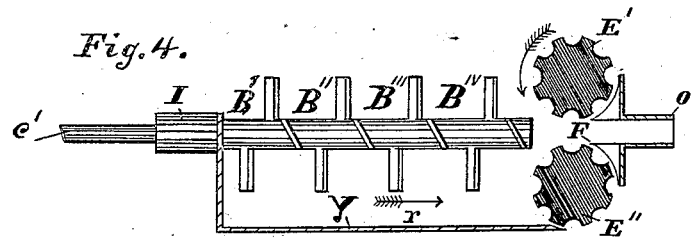

In the drawings hereto annexed, Figure 1 is a side elvation of the machine. Fig. 2 is a plan view of same. Fig. 3 is a top view of the spindles and blades, the hopper and cylinder being removed. Fig. 4 is a vertical section of rollers, scraper, and discharge-die, and showing the position of these parts with respect to the blades.

This machine is designed especially for the manufacture of crackers, the dough of which requires to be "broken" after it has been mixed. For the mixing of dough special machines are employed, and also for the cutting of the prepared dough into crackers other special cutting-machines are necessary. Now, the object of this machine is to receive the mixed dough as it comes from the mixing-machine to put it through the "breaking" process to give it the shape of a suitable web ready for the cutters, and finally to feed or deliver the prepared dough-web to the cutting-machine, all this without manual labor or touching the dough by the hand.

In the drawings, N designates the frame, R the pulley by which the machine is driven, and R' the main shaft on which the said pulley is mounted. Spindles $c'$, $c^2$, $c^3$, $c^4$, and $c^5$ are mounted side by side in a horizontal plane in suitable bearings on the cross-bars I. Bevel-gears $P'$, $P^2$, $P^3$, $P^4$, and $P^5$ connect the main shaft and the spindles. Each spindle has blades $B'$ $B''$ $B'''$ $B^{IV}$ with angular faces. Any desired number of these blades be used, and the blades are in such a position that their angular faces have a spiral relation to the axis of the spindle, and the blades are so disposed on the spindle that those of one spindle will mesh or intersect—that is, pass between— those of the next spindle when in motion. This particular kind of blade and position of blade effects a double result, namely: The dough undergoes a great amount of cross-cutting, and is therefore extra well broken, and at the same time the broken dough is carried regularly forward to be discharged. A case or cylinder, $y$, incloses the spindles and blades. A hopper, A, at one end, provides for the entry into the cylinder of the dough as it comes from the mixing-machine, and the dough while undergoing the breaking process moves forward, as indicated by the arrow $r$ in Fig. 4. At the other end of the case or cylinder are two fluted rollers, E' and E'', one above the other. These extend in a direction crosswise of the ends of all the spindles. These rollers are connected by gear-wheels. Upon the broken dough reaching the rollers by the action of the spirally-placed angular-faced blades, it is drawn between the rollers, and is thereby subjected to very great pressure, which compacts and spreads it into a sheet or web. It is necessary that the motion of the rollers be regulated to pass the dough in quantity or with speed exactly according with the quantity passing through the cylinder. Therefore the cone-pulleys H' H'' are employed. These pulleys are connected by the belt L, and gearing K from the shaft of one of the cone-pulleys drives the rollers. The combination of these cone-pulleys and the rollers effects the desired result without regard to the particular shape of the blades, regarding these simply as carriers to move the dough forward. A girdle, M, serves to hold the belt and shift it on the cone-pulleys, being moved by the cranks $x'$ $x''$. A scraper, F, at the rear or discharge side of each roller, and extending the length thereof, serves to remove the dough from the rollers. At this point the sheet or web of dough bears the marks of the fluted rollers, which it is desired to remove. A discharge-die, O, of special construction is placed adjoining the scrapers, and the upper and lower surfaces of the die may be integral with the scrapers. This discharge-die smooths the surfaces of and delivers the dough-web in a solid condition and of uniform width and thickness to the cutting-machine. This discharge-die is shown in section in Fig. 4. It is designed to be slightly contracted internally, so that the discharge-edges do not bear on the dough as hard as at the contraction. The result is that the dough-web is discharged in very superior condition for crackers.

Having described my invention, I claim and desire to secure by Letters Patent of the United States—

1. In a dough-breaker, the combination of spindles mounted side by side in a plane and provided with angular-faced blades, set spirally, and rollers extending crosswise of the ends of all the spindles, as set forth.

2. In a dough-breaker, the combination of rollers, scrapers extending the length of each roller, and a discharge-die adapted to smooth the surfaces of the dough-web, as set forth.

3. In a dough-breaker, the combination of spindles mounted side by side in a plane and provided with angular-faced blades, set spirally, fluted rollers extending crosswise of the ends of all the spindles, and a discharge-die, as set forth.

JOHN MACKINNON.

Witnesses:
MORTON S. BAILEY,
WILLIAM H. MALONE.